(12) United States Patent
Matsumura

(10) Patent No.: US 8,109,561 B2
(45) Date of Patent: Feb. 7, 2012

(54) CAR BODY STRUCTURE

(75) Inventor: Katsuya Matsumura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/000,465

(22) PCT Filed: Apr. 3, 2009

(86) PCT No.: PCT/JP2009/056957
§ 371 (c)(1),
(2), (4) Date: Dec. 21, 2010

(87) PCT Pub. No.: WO2010/113317
PCT Pub. Date: Oct. 7, 2010

(65) Prior Publication Data
US 2011/0101737 A1  May 5, 2011

(51) Int. Cl.
*B62D 25/06* (2006.01)
*B62D 25/04* (2006.01)
(52) U.S. Cl. ......... 296/193.05; 296/193.06; 296/203.03; 296/29
(58) Field of Classification Search ............ 296/187.12, 296/193.05, 193.06, 203.03, 29, 210
See application file for complete search history.

(56) References Cited

U.S. PATENT DOCUMENTS

| | | | | |
|---|---|---|---|---|
| 3,776,589 A * | 12/1973 | Barenyi et al. | ........... | 296/203.03 |
| 6,648,403 B2 * | 11/2003 | Hanyu | ........... | 296/203.03 |
| 6,789,840 B2 * | 9/2004 | Honma et al. | ........... | 296/203.03 |
| 7,431,378 B2 * | 10/2008 | Chen et al. | ........... | 296/102 |
| 7,810,871 B2 * | 10/2010 | Matsui | ........... | 296/187.12 |
| 7,883,142 B2 * | 2/2011 | Hosaka et al. | ........... | 296/210 |
| 7,914,068 B2 * | 3/2011 | Mizohata | ........... | 296/193.06 |
| 2011/0121614 A1 * | 5/2011 | Kobayashi et al. | ........... | 296/210 |

FOREIGN PATENT DOCUMENTS

| | | | |
|---|---|---|---|
| JP | 358185376 A | * | 10/1983 |
| JP | 4 193689 | | 7/1992 |
| JP | 7 132853 | | 5/1995 |
| JP | 2004 322666 | | 11/2004 |
| JP | 2005 161938 | | 6/2005 |

OTHER PUBLICATIONS

International Search Report issued Jun. 30, 2009 in PCT/JP09/56957 filed Apr. 3, 2009.
International Preliminary Report on Patentability dated Nov. 24, 2011 forwarding an English translation of Written Opinion of the International Searching Authority dated Jun. 30, 2009 issued for PCT Application No. PCT/JP2009/056957 filed Apr. 3, 2009.

* cited by examiner

*Primary Examiner* — Jason S Morrow
(74) *Attorney, Agent, or Firm* — Oblon, Spivak, McClelland, Maier & Neustadt, L.L.P.

(57) ABSTRACT

A car body structure includes a roof side rail and a front pillar, and the roof side rail and the front pillar include a roof side rail reinforcement and a front pillar reinforcement. The roof side rail reinforcement extends in a front-to-rear direction of a car body, and the front pillar reinforcement extends in a direction that intersects the front-to-rear direction of the car body. The roof side rail reinforcement and the front pillar reinforcement are connected to each other so that an end of a lower side wall of the roof side rail reinforcement abuts an end of the outer side wall of the front pillar reinforcement in the front-to-rear direction of the car body and an end of an upper side wall of the roof side rail reinforcement overlaps an end of an inner side wall of the pillar front pillar reinforcement.

5 Claims, 2 Drawing Sheets

CAR BODY STRUCTURE

TECHNICAL FIELD

The present invention relates to a car body structure.

BACKGROUND ART

An example of a car body structure in the related art is disclosed in PTL 1. The car body structure disclosed in PTL 1 includes a roof side rail that extends in the front-to-rear direction of a car body and a front pillar that is connected to a front end of the roof side rail.

Citation List

Patent Literature
[PTL 1] Japanese Unexamined Patent Application Publication No. 2005-161938

SUMMARY OF INVENTION

Technical Problem

An inclined pillar is further connected to a connection portion between the roof side rail and the front pillar, so that this car body structure efficiently transmits a load, which is input from the front side of the car body, to the roof side rail from the front pillar. As described above, the car body structure requires the transmission of a load, which is input to the pillar, to the roof side rail.

The invention has been made in consideration of the above-mentioned circumstances, and an object of the invention is to provide a car body structure capable of reliably transmitting a load, which is input to a pillar, to a roof side rail.

Solution to Problem

In order to achieve the object, a car body structure according to the invention includes a roof side rail that extends in a predetermined direction, and a pillar that extends in a direction intersecting the predetermined direction. The roof side rail and the pillar are connected to each other so that a first end of the roof side rail abuts a first wall portion of the pillar along the predetermined direction and a second end of the roof side rail overlaps a second wall portion of the pillar.

In this car body structure, the first end of the roof side rail abuts the first wall portion of the pillar in a predetermined direction, and the second end of the roof side rail and the second wall portion of the pillar overlap each other. Accordingly, it is possible to join the roof side rail to the pillar at an overlapping portion where the second end and the second wall portion overlap each other while maintaining a state where the first end abuts the first wall portion. Therefore, it is possible to reliably transmit a load, which is input to the pillar, to the roof side rail through the first end that abuts the first wall portion in the predetermined direction.

Further, in the car body structure according to the invention, the first wall portion may extend toward a gap between the first end and the second end. In this case, it is possible to prevent the first wall portion from protruding to the outside of the car body.

Advantageous Effects of Invention

According to the invention, it is possible to provide a car body structure capable of reliably transmitting a load, which is input to a pillar, to a roof side rail.

DESCRIPTION OF EMBODIMENTS

Figure 1:
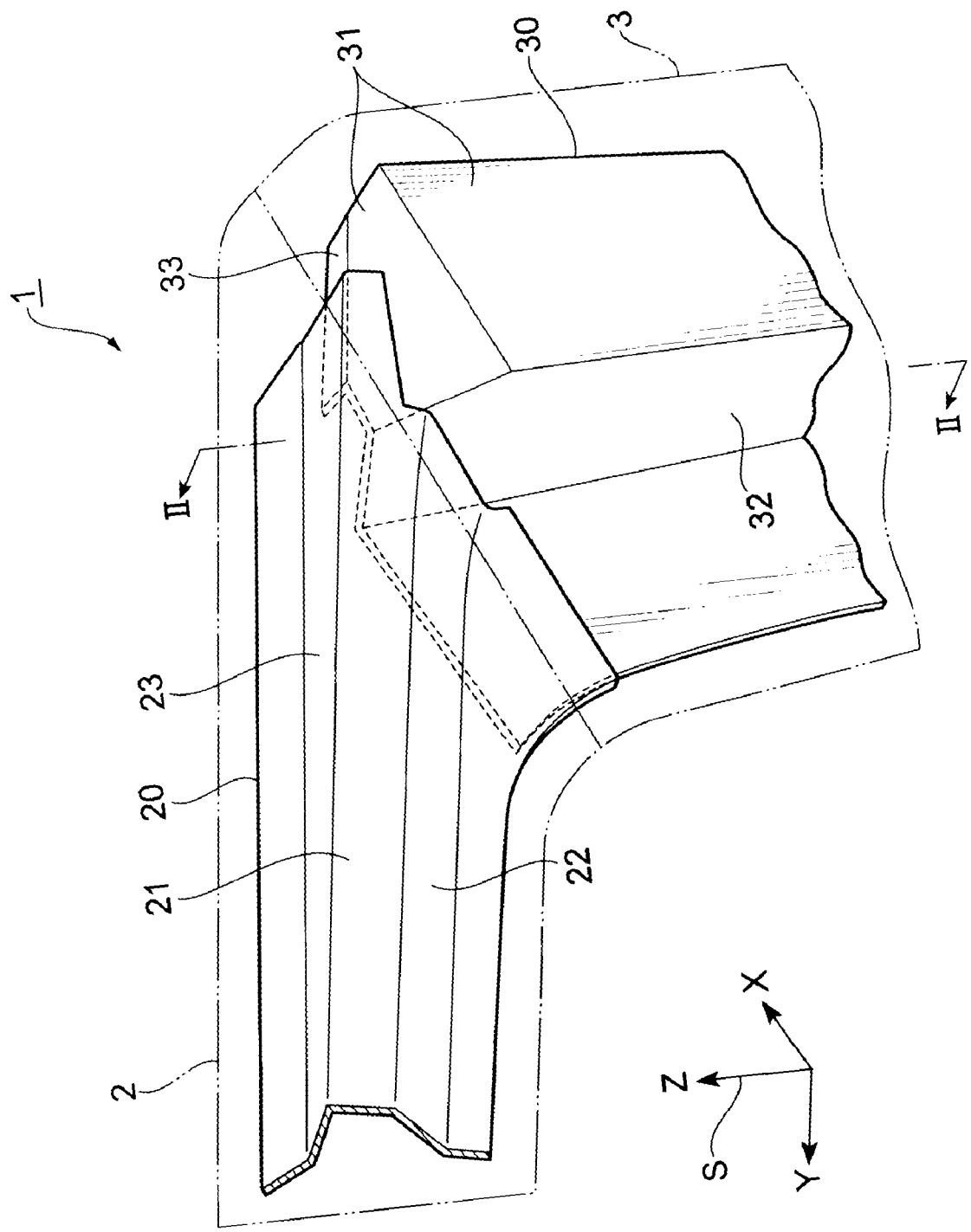
FIG. 1 is a partial perspective view of an embodiment of a car body structure according to the invention.

A preferred embodiment of the invention will be described in detail below with reference to the drawings. Meanwhile, in each drawing, the same components or corresponding components are denoted by the same reference numerals, and repeated description thereof will be omitted.

FIG. 1 is a partial perspective view of an embodiment of a car body structure according to the invention. In a coordinate system S shown in FIG. 1, the X axis represents the width direction of a car body, the Y axis represents the front-to-rear direction of the car body, and the Z axis represents the up-and-down direction of the car body. As shown in FIG. 1, a car body structure 1 includes a roof side rail 2. The roof side rail 2 is provided between a side window and a roof panel, and extends in the front-to-rear direction (predetermined direction) of the car body. The roof side rail 2 includes an inner member (not shown) and an outer member that forms the outer shell of the roof side rail 2. A roof side rail reinforcement (hereinafter, referred to as a roof R/F) 20, which extends in the front-to-rear direction of the car body, is disposed between the outer member and the inner member.

The roof R/F 20 is integrally formed by pressing a metal plate such as a steel plate, and has an open cross-sectional structure that is open to the inside of the car body. The roof R/F 20 includes a main body wall 21 that extends in the front-to-rear direction of the car body, a lower side wall 22 that extends along the lower end of the main body wall 21 from the main body wall 21 to the inside of the car body, and an upper side wall 23 that extends along the upper end of the main body wall 21 from the main body wall 21 to the inside of the car body.

A front pillar 3 is connected to the front end of the roof side rail 2. The front pillar 3 is provided between the side window and the front window, and extends from the front end of the roof side rail 2 in the up-and-down direction of the car body. The front pillar 3 includes an inner member (not shown) and an outer member that forms the outer shell of the front pillar 3. A front pillar reinforcement (hereinafter, referred to as a pillar R/F) 30, which extends in the up-and-down direction of the car body, is disposed between the outer member and the inner member.

The upper end of the pillar R/F 30 is connected to the front end of the roof R/F 20. The pillar R/F 30 is integrally formed by pressing a metal plate such as a steel plate, and has an open cross-sectional structure that is open to the rear side of the car body. The pillar R/F 30 includes a main body wall 31, an outer side wall (first wall portion) 32 that extends along the outer end of the main body wall 31 from the main body wall 31 to the rear side of the car body, and an inner side wall (second wall portion) 33 that extends along the inner end of the main body wall 31 from the main body wall 31 to the inside of the car body. An outer side wall 32 extends from the upper end of the pillar R/F 30 in the up-and-down direction of the car body, and an inner side wall 33 extends from the upper end of the pillar R/F 30 in the front-to-rear direction of the car body.

Meanwhile, the roof side rail 2 and the roof R/F 20 extend in the front-to-rear direction of the car body. However, the roof side rail 2 and the roof R/F 20 are not limited thereto, and may extend in a direction that is arbitrarily inclined from the front-to-rear direction of the car body. Further, the front pillar 3 and the pillar R/F 30 extend in the up-and-down direction of the car body. However, the front pillar 3 and the pillar R/F 30 are not limited thereto, and may extend in an arbitrary direction that intersects the front-to-rear direction of the car body.

Figure 2:
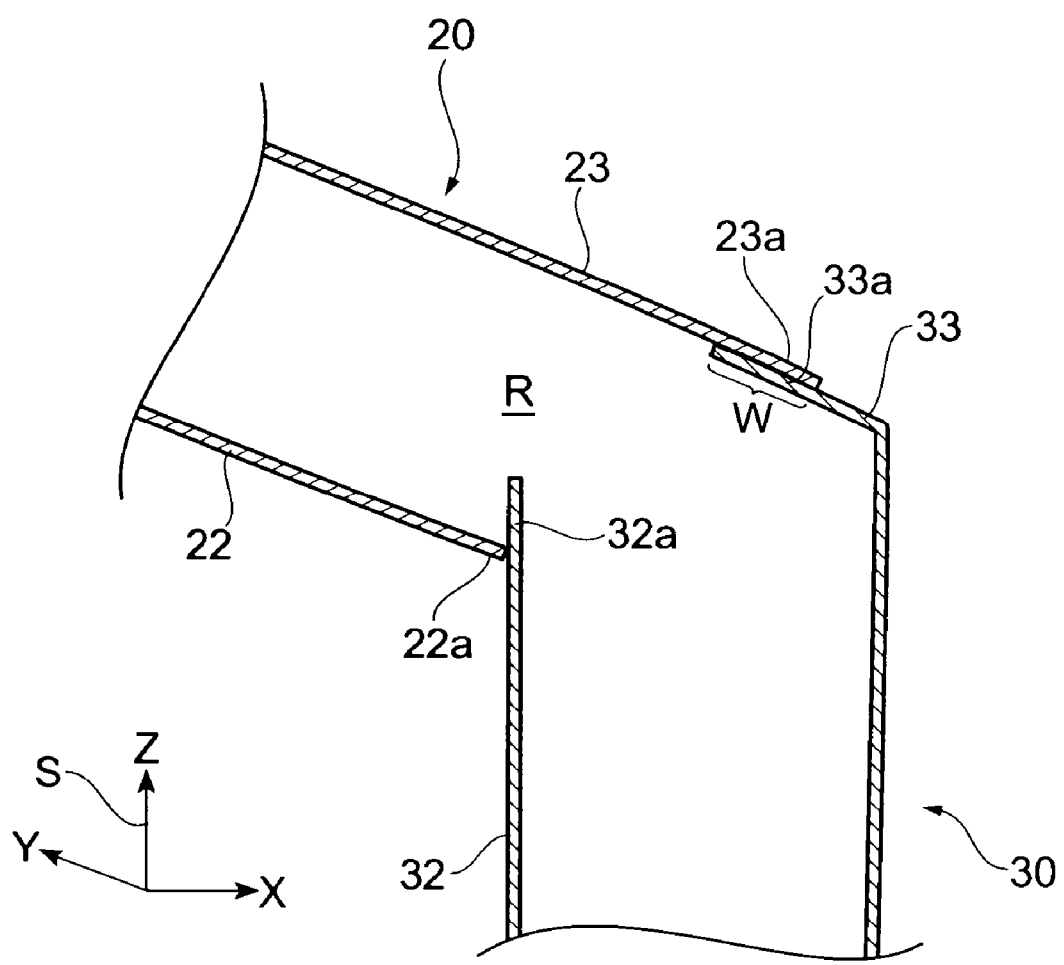
FIG. 2 is a end view taken along a line II-II of FIG. 1.

The structure of a connection portion between the roof R/F 20 and the pillar R/F 30 will be described in detail below. FIG. 2 is a end view taken along a line II-II of FIG. 1. As shown in FIG. 2, the outer side wall 32 of the pillar R/F 30 extends to an inner area R of the roof R/F 20 (between an end 22a (first end) of the lower side wall 22 of the roof R/F 20 and an end 23a (second end) of the upper side wall 23), and the tip surface of the end 22a of the lower side wall 22 of the roof R/F 20 abuts the outer surface of the end 32a of the outer side wall 32 from the rear side in the front-to-rear direction of the car body. Further, the inner side wall 33 of the pillar R/F 30 extends toward the inner area R of the roof R/F 20, and the outer surface of an end 33a of the inner side wall 33 overlaps the inner surface of an end 23a of the upper side wall 23 of the roof R/F 20.

As described above, the roof R/F 20 and the pillar R/F 30 are connected to each other so that the end 22a of the lower side wall 22 of the roof R/F 20 abuts the end 32a of the outer side wall 32 of the pillar R/F 30 in the front-to-rear direction of the car body and the end 23a of the upper side wall 23 of the roof R/F 20 overlaps the end 33a of the inner side wall 33 of the pillar R/F 30. While the roof R/F 20 and the pillar R/F 30 are connected to each other as described above, the end 23a of the upper side wall 23 of the roof R/F 20 and the end 33a of the inner side wall 33 of the pillar R/F 30 are joined to each other by spot welding or the like. Here, an overlapping portion W where the end 23a of the upper side wall 23 of the roof R/F 20 overlaps the end 33a of the inner side wall 33 of the pillar R/F 30 extends in the front-to-rear direction of the car body.

In the car body structure 1 formed as described above, the end 23a of the upper side wall 23 of the roof R/F 20 and the end 33a of the inner side wall 33 of the pillar R/F 30 overlap each other in the front-to-rear direction of the car body. For this reason, while the end 23a of the upper side wall 23 of the roof R/F 20 and the end 33a of the inner side wall 33 of the pillar R/F 30 overlap each other, it is possible to reliably make the end 22a of the lower side wall 22 of the roof R/F 20 abut the end 32a of the outer side wall 32 of the pillar R/F 30 by adjusting the width of the overlapping portion W in the front-to-rear direction of the car body. Accordingly, it is possible to join the roof R/F 20 to the pillar R/F 30 at the overlapping portion W while preferably maintaining a state where the end 22a of the lower side wall 22 of the roof R/F 20 abuts the end 32a of the outer side wall 32 of the pillar R/F 30. Therefore, it is possible to reliably transmit a load, which is input to the pillar R/F 30, to the roof R/F 20 in the front-to-rear direction of the car body. That is, according to the car body structure 1, it is possible to reliably transmit a load, which is input to the front pillar 3, to the roof side rail 2 through the end 22a of the lower side wall 22 of the roof R/F 20 that abuts the outer surface of the end 32a of the outer side wall 32 of the pillar R/F 30 in the front-to-rear direction of the car body.

Further, since the outer side wall 32 of the pillar R/F 30 extends toward the inner area R of the roof R/F 20, it is possible to prevent the outer side wall 32 from protruding to the outside of the car body. Furthermore, since each of the roof R/F 20 and the pillar R/F 30 has a relatively uncomplicated shape, it is possible to make the roof R/F 20 and the pillar R/F 30 from a steel plate such as a high-tensile material (high tensile strength steel) that is, for example, a light and high-strength iron.

INDUSTRIAL APPLICABILITY

According to the invention, it is possible to provide a car body structure capable of reliably transmitting a load, which is input to a pillar, to a roof side rail.

REFERENCE SIGNS LIST

1: CAR BODY STRUCTURE
2: ROOF SIDE RAIL
3: FRONT PILLAR
20: ROOF SIDE RAIL REINFORCEMENT
22: LOWER SIDE WALL
23: UPPER SIDE WALL
22a, 23a: END
30: FRONT PILLAR REINFORCEMENT
32: OUTER SIDE WALL
33: INNER SIDE WALL

The invention claimed is:

1. A car body structure comprising:
a roof side rail that extends in a front-to-rear direction of a car body when fully assembled to the car body; and
a pillar that extends in a direction that intersects the front-to-rear direction, the pillar including a first wall portion that extends from an upper end of the pillar in an up-and-down direction of the car body, and a second wall portion that extends from the upper end of the pillar in the front-to-rear direction,
wherein the roof side rail and the pillar are connected to each other so that a tip surface of an end of a lower side wall of the roof side rail abuts an outer surface of the first wall portion of the pillar from a rear side in the front-to-rear direction, and an outer surface of the second wall portion overlaps and is in direct abutment with an inner surface of an upper side wall of the roof side rail.

2. The car body structure according to claim 1, wherein the first wall portion extends toward a gap between the lower side wall of the roof side rail and the upper side wall of the roof side rail.

3. The car body structure according to claim 1,
wherein the roof side rail has an open cross-sectional structure that is open to an inside of the car body when fully assembled to the car body, the roof side rail including
a main body wall that extends in the front-to-rear direction,
the lower side wall, the lower side wall extending along a lower end of the main body wall from the main body wall to an inside of the car body, and
the upper side wall, the upper side wall extending along an upper end of the main body wall from the main body wall to the inside of the car body, and
wherein the pillar has an open cross-sectional structure that is open to a rear side of the car body when fully assembled to the car body, the pillar including
a main body wall,
the first wall portion, the first wall portion extending along an outer end of the main body wall from the main body wall to a rear side of the car body, and
the second wall portion, the second wall portion extending along an inner end of the main body wall from the main body wall to an inside of the car body.

4. The car body structure according to claim 3, wherein the first wall portion of the pillar extends to an inner area of the roof side rail located between the lower side wall of the roof side rail and the upper side wall of the roof side rail.

5. The car body structure according to claim 4, wherein the second wall portion of the pillar extends toward the inner area of the roof side rail.

* * * * *